(No Model.) 2 Sheets—Sheet 1.
J. D. WRIGHT.
MECHANICAL MOVEMENT.
No. 267,638. Patented Nov. 14, 1882.
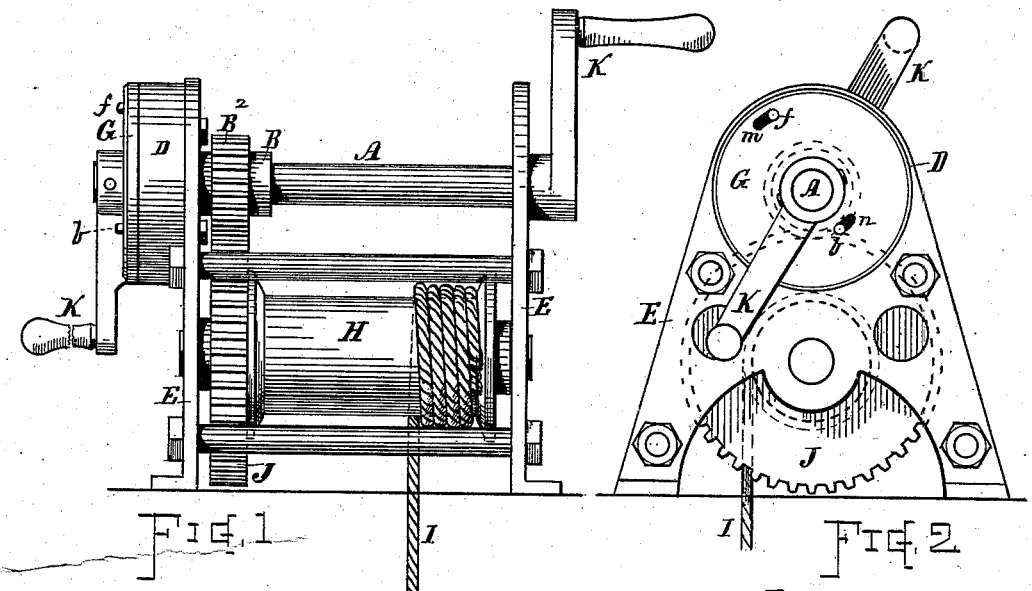
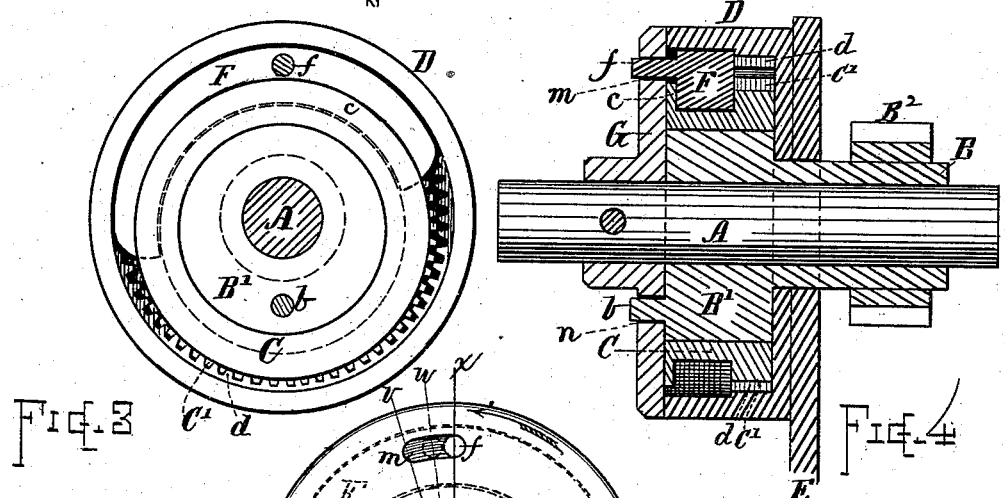
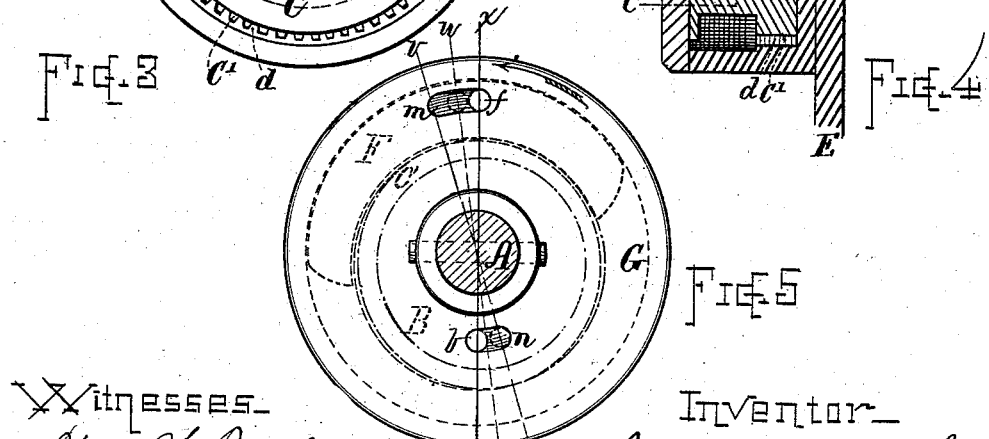
Witnesses  
Wm F. Burleigh  
S. K. Barton
Inventor  
Jacob D. Wright  
by Chas H. Burleigh  
Atty.

(No Model.) J. D. WRIGHT.
MECHANICAL MOVEMENT.

No. 267,638. Patented Nov. 14, 1882.

WITNESSES.
S. R. Barton
J. H. Smith

INVENTOR-
Jacob D. Wright
By Chas. H. Burleigh,
Atty.

UNITED STATES PATENT OFFICE.

JACOB D. WRIGHT, OF WORCESTER, MASSACHUSETTS, ASSIGNOR TO THE WRIGHT MACHINE COMPANY, OF SAME PLACE.

MECHANICAL MOVEMENT.

SPECIFICATION forming part of Letters Patent No. 267,638, dated November 14, 1882.

Application filed June 11, 1881. (No model.)

*To all whom it may concern:*

Be it known that I, JACOB D. WRIGHT, of Worcester, in the county of Worcester and State of Massachusetts, have invented certain new and useful Improvements in Mechanical Movements; and I declare the following to be a description of my said invention sufficiently full, clear, and exact to enable others skilled in the art to which it appertains to make and use the same, reference being had to the accompanying drawings, which form a part of this specification.

The object of my present invention is to provide a convenient and practical mechanism for the transmission and repression of power and motion through the medium of a revoluble shaft and a revoluble pulley, sleeve, gear, or equivalent device mounted in connection therewith, or vice versa, said mechanism being adapted for free action, both for right and left revolution, by force operating in one direction or applied at one part of the mechanical train, while it resists motion or action resulting from forces operating in an opposite direction or applied at the opposite part of the train. I attain these objects by mechanism organized and operating as herein illustrated and described, the particular features claimed being hereinafter definitely specified.

This invention is applicable to all classes of machinery requiring in their action a mechanical movement having the functions herein described.

Figure 6:
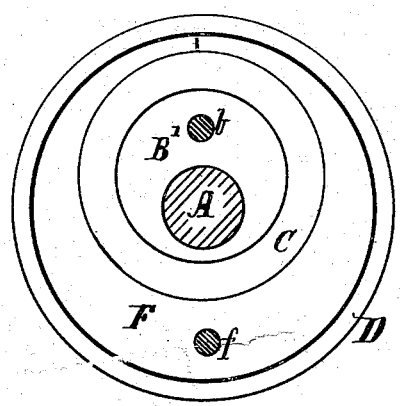
Figure 7:
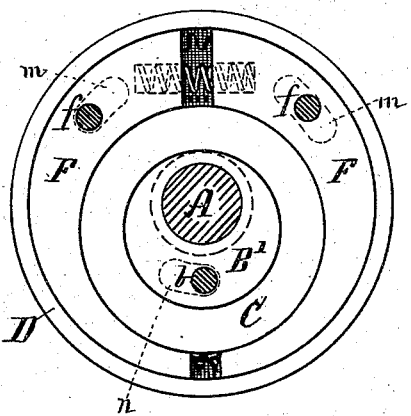
Figure 8:
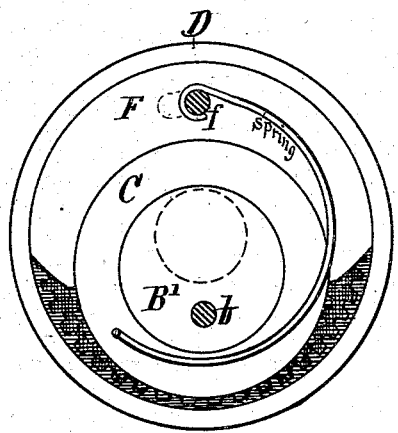

In the accompanying drawings, which show my improved mechanical movement applied for use as an operator and safety-check for a hoisting-drum, Figure 1 represents a side view of the hoisting mechanism with my invention applied thereto. Fig. 2 is an end view of the same. Fig. 3 is a side view of the mechanical movement with the disk removed. Fig. 4 is a central sectional view of the same at line $x$ $x$. Fig. 5 is a side view of the disk, with diagram-lines illustrating the action; and Figs. 6, 7, and 8 illustrate certain modifications in construction, hereinafter referred to.

In the construction, A denotes a revoluble shaft.

B indicates a sleeve mounted on said shaft to turn loose thereon, and provided with an eccentric, B′, as shown. Said sleeve B may form the hub or axial support of a gear, $B^2$, or any equivalent device, or be connected to or with the operating or operated mechanism in any suitable manner.

C denotes a circle or ring-piece mounted to run loose on the surface of the eccentric B′, but arranged to be non-revoluble therewith. In the present instance said ring-piece is provided with a guard-flange, $c$, and with gear-teeth C′.

D denotes a cylindrical casing arranged concentric with the shaft A, and fixed in stationary position on the supporting-frame E. Said cylinder D is in the present instance provided with internal gear-teeth, $d$, which mesh with the teeth of the ring C for the purpose of confining said ring in such a manner as will prevent its revolving with the eccentric B′, while permitting the necessary freedom of action to allow the ring to conform to the side throw or movement of the eccentric. If preferred, any suitable device or equivalent could be employed in lieu of the gear-teeth for confining the ring C within the cylinder D, with similar effect.

F denotes a crescent-shaped wedge or follower arranged within the space between the ring C and inner surface of the cylinder D. Said follower is of such size and form as will fit loose and free between the ring and cylinder at their position of greatest eccentricity, but will bind or wedge between said parts when moved either to the right or left, except the follower F and eccentric B′ be moved simultaneously and in conformity with each other.

G denotes a disk, corresponding in the present instance with the size of the cylinder D, rigidly keyed to the shaft A, and provided with slots or recesses $m$ and $n$, which engage with pins or lugs $f$ and $b$, respectively fixed on the follower F and eccentric B′, and whereby said parts are moved when the said disk and shaft are revolved. In lieu of making the slots in the disk G and fixing the pins or lugs on the wedge F and eccentric B′, the construction may be reversed, or any devices may be employed with the disk for equivalent engagement with the wedge and eccentric, the operation being essentially the same in either case.

In Fig. 1, H indicates the winding-drum for the hoisting-rope I, and said drum is operated by the gear J, which meshes with the gear B² on the sleeve B.

K K indicate the cranks or devices for operating the shaft A or applying the power to the mechanism.

In the operation, when force is applied to the shaft A the revolution of the disk G carries around the eccentric B' and follower-wedge F with a uniform movement, the two pieces eccentrically compensating each other and working freely within the cylinder; but when force is applied to the sleeve B the slots or recesses $m$ $n$ permit independent movement of the parts, (see lines $w$ $w$ and $v$ $v$, Fig. 5,) and the follower F becomes firmly wedged between the ring C and cylinder D, preventing any further revolution or movement of the parts. Thus in the hoisting mechanism the drum H can be readily operated by force applied to the cranks K on shaft A; but the strain of the weight on rope I when the cranks are left free will not cause the drum H to run backward and drop the load. The effect is substantially the same whether the revolution is in one direction or the other, the power being transmitted when applied to the shaft A and resisted when applied to the sleeve B.

I do not desire to confine myself to the exact arrangement and proportions of devices herein shown, as the construction may be modified to conform to the size and requirements of the machinery whereon the movement is used, and the parts may be arranged so that either one shall be prime mover without variation in their relative organization and operation and without departure from the essential nature of the invention.

The wedge-piece F could, if desired, be made as a full circle or crescentic ring, (see Fig. 6,) conforming to and extending around in the eccentric space between the ring-piece C and cylinder D, and occupying the whole of said space instead of a portion only, as shown; and said wedge may be seated on or fitted directly to the surface of the eccentric B', the ring-piece C being omitted between said surfaces, or employed as a friction-ring against the sides only of said wedge. I prefer, however, the construction and arrangement shown.

If desired, a spring may be arranged in connection with the wedge F, for pressing it toward one side or the other, as indicated in Fig. 8, so that it will bind or act more readily in such direction, this being in some cases and for some purposes desirable. Also, if desired, a friction-piece (to slide in a V-shaped groove, or otherwise arranged) may be employed between the wedge F and cylinder D, to retain said parts to each other with greater tenacity and prevent any liability of the wedge dropping forward or backward by its gravity when at the side positions in the revolution of the mechanism.

As another modification, the wedge-piece F can be formed in two separate parts, arranged with a spring for pressing the respective parts toward the right and left, as illustrated in Fig. 7, so as to take up all backlash between the contact-surfaces, and each of said parts being separately connected with the disk G by slots $m$ and pins $f$. This may be desirable in machines wherein very quick action is essential.

What I claim as of my invention, and desire to secure by Letters Patent, is—

1. A mechanical movement or device consisting of a central shaft, an external cylinder concentric therewith, a sleeve mounted on said shaft and having an eccentric within said cylinder, a ring-piece mounted on said eccentric, a circular or crescent-formed wedge or follower arranged between said ring-piece and cylinder, and a disk fixed on said shaft and engaging said eccentric and follower by lugs and recesses, permitting slight movement between the same, substantially as hereinbefore set forth.

2. In a mechanical movement, the combination of an eccentric revoluble cam, a surrounding stationary cylinder, a follower or cramping device located between said eccentric and cylinder, and adapted to work free when at a position that coincides with the eccentricity of said cam and to cramp or engage the surfaces when deviated or extended to the right or left from said position, and a follower-operating connection or means adapted for moving said follower in unison with said eccentric and preventing its cramping or engagement when the motive power is exerted by either right or left revolution from one end of the mechanical train, while permitting independent action or deviation of said follower or device relatively to said eccentric to effect engagement, cramping, or locking of the mechanism when a force or power is exerted from the opposite end of the mechanical train tending either to right or left revolution.

3. The combination, with the revoluble crank-shaft and stationary cylinder, of the gear-sleeve provided with an eccentric, the follower-wedge, conforming to the space between said eccentric and cylinder, and a slotted disk and connecting devices adapted for moving said follower and eccentric in unison with said shaft when said shaft serves as prime mover, but permitting independent action of said eccentric and non-action of the follower when force is applied to said sleeve, or vice versa, as hereinbefore set forth.

4. The combination of the cylinder D, the eccentric B', the follower F, and the disk G with connecting devices $m$ $f$ and $b$ $n$, as and for the purpose set forth.

5. The combination of the operating-shaft A, the sleeve B, with driving-gear B² and eccentric B' mounted thereon, the stationary cylinder D, having internal teeth, $d$, the ring-piece C, differentially geared to said cylinder, the follower F, disk G, and devices for connecting and operating the same, as hereinbefore set forth.

6. The combination, with the driven part B, provided with an eccentric, B', of the ring-piece C, mounted on said eccentric and non-revoluble therewith, the double wedge or wedges mounted on said ring-piece, with or without a spring device, the surrounding cylinder D, and means for moving said wedge and eccentric in unison by the driving devices, and for releasing said wedge when backward-acting strains are exerted in excess of the driving forces, as set forth.

Witness my hand this 6th day of June, A. D. 1881.

JACOB D. WRIGHT.

Witnesses:
CHAS. H. BURLEIGH,
GEO. M. RICE, 2d.